United States Patent
Smith et al.

(10) Patent No.: US 10,738,443 B1
(45) Date of Patent: *Aug. 11, 2020

(54) PORTABLE FAUCET

(71) Applicant: Faucet Away from Home, LLC, West Columbia, SC (US)

(72) Inventors: Earnest Lora Smith, West Columbia, SC (US); Lonnie Smith, Blackstone, VA (US)

(73) Assignee: Faucet Away From Home, LLC, Blackstone, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/043,740

(22) Filed: Jul. 24, 2018

Related U.S. Application Data (63) Continuation of application No. 15/691,953, filed on Aug. 31, 2017, now Pat. No. 10,060,103.

(60) Provisional application No. 62/382,583, filed on Sep. 1, 2016.

(51) Int. Cl.

| | |
|---|---|
| *F16K 5/00* | (2006.01) |
| *E03C 1/02* | (2006.01) |
| *F16K 11/10* | (2006.01) |
| *B05B 1/18* | (2006.01) |
| *B05B 1/16* | (2006.01) |
| *E03C 1/06* | (2006.01) |
| *B05B 15/60* | (2018.01) |

(52) U.S. Cl.
CPC ............ *E03C 1/021* (2013.01); *B05B 1/1636* (2013.01); *B05B 1/18* (2013.01); *B05B 15/60* (2018.02); *E03C 1/06* (2013.01); *F16K 11/10* (2013.01); *E03C 2201/30* (2013.01); *E03C 2201/80* (2013.01)

(58) Field of Classification Search
CPC .. E03C 1/021; E03C 1/06; A47K 3/06; A47K 3/325; A45D 19/04
See application file for complete search history.

(56) References Cited

U.S. PATENT DOCUMENTS

| | | | | |
|---|---|---|---|---|
| 1,336,034 | A | | 4/1920 | Jensen |
| 1,628,458 | A | * | 5/1927 | French ...................... B65F 7/00 239/283 |
| 3,142,443 | A | * | 7/1964 | Morgan .................... E03B 9/20 239/24 |
| 3,925,828 | A | * | 12/1975 | Kim ........................ A47K 3/325 4/599 |
| D251,794 | S | | 5/1979 | Smith |
| 4,280,643 | A | * | 7/1981 | Cordova ................... A45F 3/00 206/225 |
| 5,251,345 | A | * | 10/1993 | Pechner ................. A47K 3/325 4/603 |
| 5,774,908 | A | | 7/1998 | Hall |

(Continued)

*Primary Examiner* — Reinaldo Sanchez-Medina
(74) *Attorney, Agent, or Firm* — Thedford I. Hitaffer; Hitaffer & Hitaffer, PLLC (57) ABSTRACT

A portable outdoor faucet is configured for attachment with a source of water via a hose. The faucet comprises a shower nob and a sprayer head, connected in relation to a main valve, which is operable to selectively direct fluid to the shower nob and the sprayer head. A hose attachment is connected in relation to the main valve. The hose attachment for attachment of a hose originating from a water source for directing water from the water source to the valve. A clamp assembly supports the main valve in relation to an environmental surface.

21 Claims, 8 Drawing Sheets

(56) References Cited

U.S. PATENT DOCUMENTS

| | | | |
|---|---|---|---|
| 5,775,591 A * | 7/1998 | Fauci | B05B 9/0816 |
| | | | 239/304 |
| 7,657,949 B2 | 2/2010 | Zhadanov | |
| 9,351,611 B1 * | 5/2016 | Adrian | F24D 19/00 |
| 10,060,103 B1 * | 8/2018 | Smith | E03C 1/021 |

* cited by examiner

PORTABLE FAUCET

CROSS-REFERENCE TO RELATED APPLICATIONS

This application is a continuation of U.S. patent application Ser. No. 15/691,953, filed Aug. 31, 2017, which claims the benefit of U.S. Provisional Application No. 62/382,583, filed Sep. 1, 2016, the disclosures of which is incorporated herein by reference in its entirety.

BACKGROUND OF THE INVENTION

This invention relates in general to faucets, and more particularly, to portable faucets.

People are accustomed to using a sink or faucet regularly. When away from the comforts of home, during outdoor activities, the convenient use of a faucet is disrupted. There is a need for a portable faucet, particularly, an outdoor faucet, which can be used outdoors, such as when camping, boating, fishing, grilling, tailgating, gardening, and the like, for cleaning, and more.

SUMMARY OF THE INVENTION

This invention relates to a portable outdoor faucet that mounts to most any surfaces, and to which a water hose may be attached to provide a water source where desired. This faucet may be comprised of a water supply connection, a lower stem, a three-way ball valve, an upper stem as well as connections and brackets for miscellaneous accessories such as a sprayer/shower hose, a mirror and a towel hook.

An exemplary faucet is configured for attachment with a source of water via a hose. The faucet comprises a shower nob and a sprayer head, connected in relation to a main valve, which is operable to selectively direct fluid to the shower nob and the sprayer head. A hose attachment is connected in relation to the main valve. The hose attachment for attachment of a hose originating from a water source for directing water from the water source to the valve. A clamp assembly supports the main valve in relation to an environmental surface.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the seat will become more fully appreciated when considered in view of the accompanying drawings, in which like reference characters designate the same or similar parts and/or features throughout the several views, and wherein.

DETAILED DESCRIPTION OF THE PREFERRED EMBODIMENT

Figure 1:
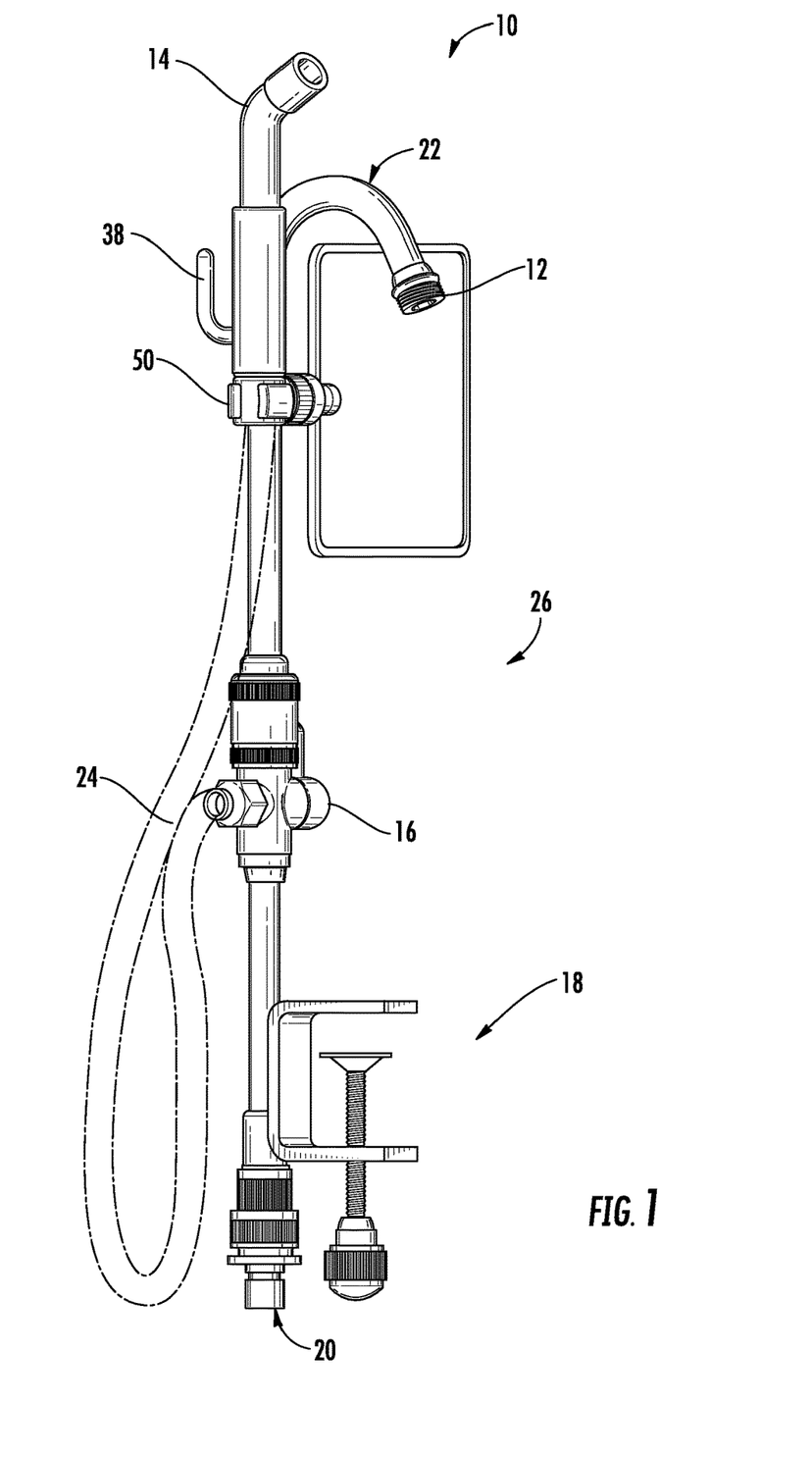
FIG. 1 is a front perspective view of a portable faucet.

Referring now to the drawings, there is illustrated in FIG. 1 a portable faucet, generally indicated at 10, particularly suitable for outdoor use, and which is configured for attachment with a hose, such as a garden hose. The faucet 10 generally comprises a spigot or shower nob 12 and a sprayer or sprayer head 14 connected to a ball valve 16. The ball valve 16 may be supported in relation to an environmental surface, such an edge of a table top, by a C-clamp assembly 18. A hose attachment 20 is provided for the attachment of a hose (not shown), originating from a water source.

Figure 2:
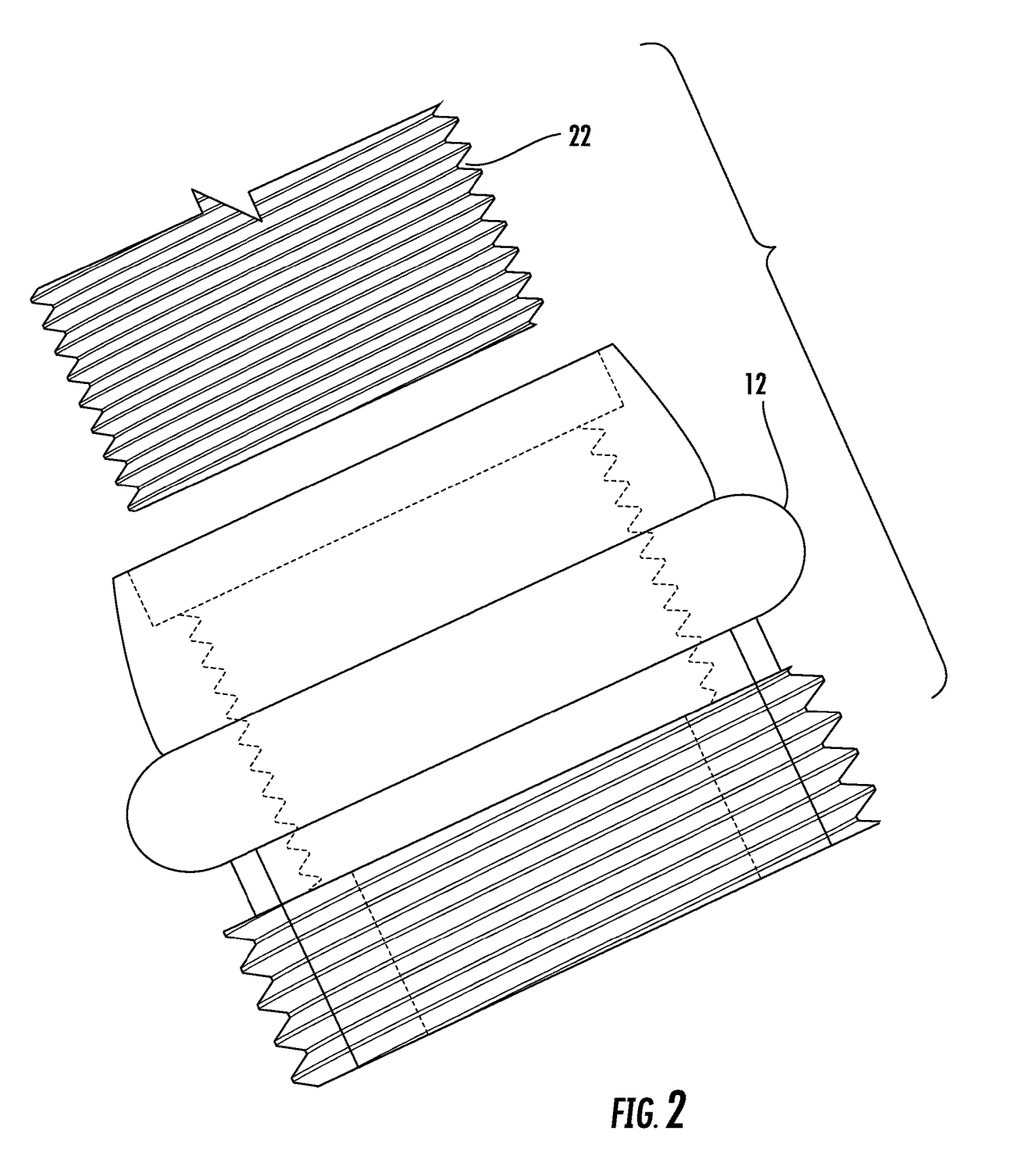
FIG. 2 is an enlarged exploded view of a shower nob attached to a terminal or proximal end of a bend pipe.

The shower nob 12 is supported in relation to a gooseneck bend pipe 22, such as at a terminal or proximal end of the bend pipe 22. The shower nob 12 may be supported in relation to the bend pipe 22 in any suitable manner. In the illustrated embodiment, the shower nob 12 may include a female thread (e.g., M16×1 mm pitch) that mates with a male thread at the proximal end of the bend pipe 22, as shown in FIG. 2. Alternatively, the shower nob 12 may be attached to the bend pipe 22, such as by soldering, brazing or welding. The shower nob 12 may take on any suitable configuration. In the illustrated embodiment, the shower nob 12 is threaded with a thread (e.g., ½" BSP) suitable for mating with the sprayer head 14, to provide an alternative point of connection for a sprayer hose 24 (referred to hereinbelow), to provide extended height for the sprayer head 14, or it may be provided with some other suitable feature for providing some other connection point, such as a thread for attachment of a garden hose (not shown), or for attachment of a diffuser, for directing a spray pattern, or an aerator, screen, filter, and/or the like.

The bend pipe 22 shown is in the approximate shape of an inverted J, wherein a short leg of the J is at an angle in relation to a long leg thereof (i.e., directed away from the long leg), although the bend pipe 22 may be in another form or configuration. In the illustrated embodiment, the bend pipe 22 is shaped to direct water therefrom downward and toward a user.

Figure 3:
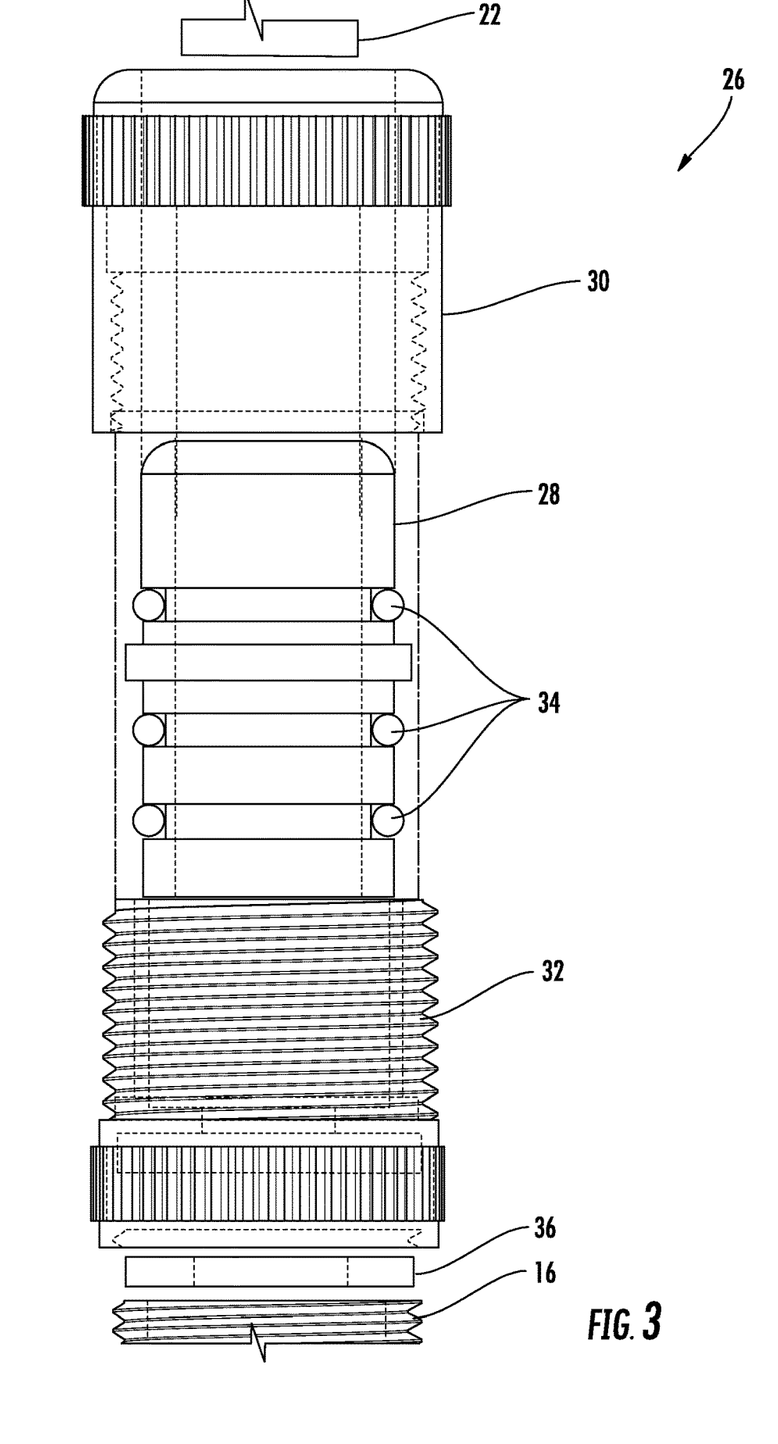
FIG. 3 is an enlarged exploded view of a tap rotating system for attaching a distal end of the bend pipe to a first outlet of the ball valve.

As shown in FIG. 3, an opposing or distal end of the bend pipe 22 is attached to a first outlet of the ball valve 16. This can be done in any suitable manner. In the illustrated embodiment, the bend pipe 22 is attached to the ball valve 16 via a tap rotating system, generally indicated at 26. The tap rotating system 26 may be comprised of an inner part 28, which may be fixed in relation to the distal end of the bend pipe 22, such as by threading, soldering, brazing, welding, or in another suitable manner. The inner part 28 may be supported for rotational movement in relation to an outer part 30 of the tap rotating system 26. A rotating nut 32 is supported in relation to the outer part 30, such as by mating threads (e.g., M28×1.5" pitch), to hold the inner part 28 within the outer part 30. The tap rotating system 26 is secured in relation to the ball valve 16 via the outer part 30, such as by use of mating threads (e.g., 1" BSP). Seals, such as silicone O-rings 34, may be provided between the inner and outer parts 28, 30 and the rotating nut 32 to provide a fluid tight seal therebetween. A seal, such as a silicone washer 36, is seated between the rotating nut 32 and a housing or body of the ball valve 16. The tap rotating system 26 is provided to provide a sealed attachment between the ball valve 16 and the bend pipe 22, to hold the bend pipe 22 against axial movement while providing for rotational movement of the bend pipe 22 in relation to the ball valve 16.

Referring back to FIG. 1, there is illustrated a towel holder 38, which extends from a back portion of the bend pipe 22 (i.e., in a direction away from the user). The towel holder 38 is in the general shape of an L, where a lower leg thereof extends transversely from the bend pipe 22 and an upper leg extends upwardly, so as to provide a hook-shaped configuration, upon which a towel (not shown) may be supported. It should be noted that the towel holder 38 is so situated that it may support a towel while the shower nob 12 is in use without interfering with the use of the shower nob 12. The towel holder 38 may be supported in any suitable manner, including but not limited to brazing, soldering or welding the towel holder 38 to the bend pipe 22.

Figure 4:
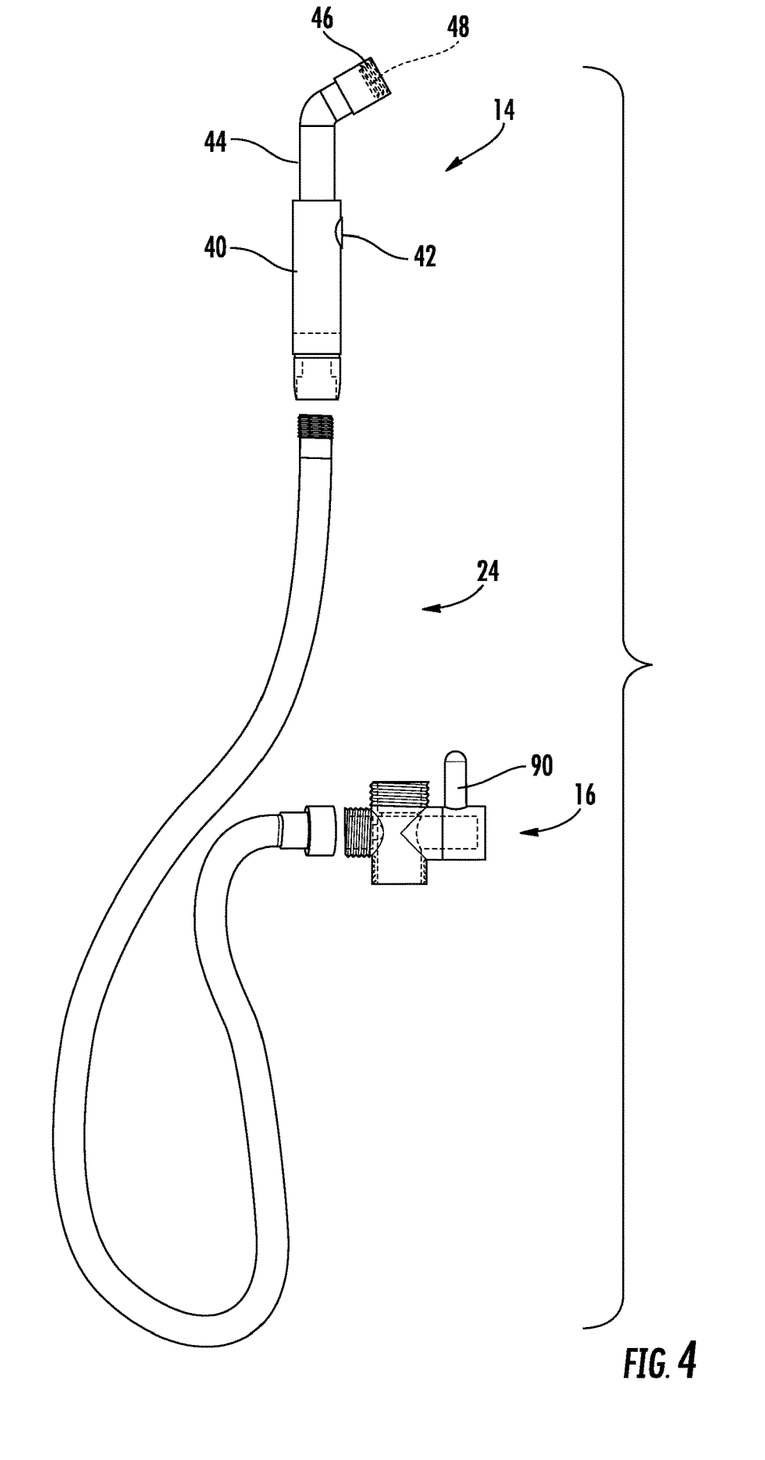
FIG. 4 is an exploded view of a sprayer head, sprayer hose and ball valve.
Figure 5:
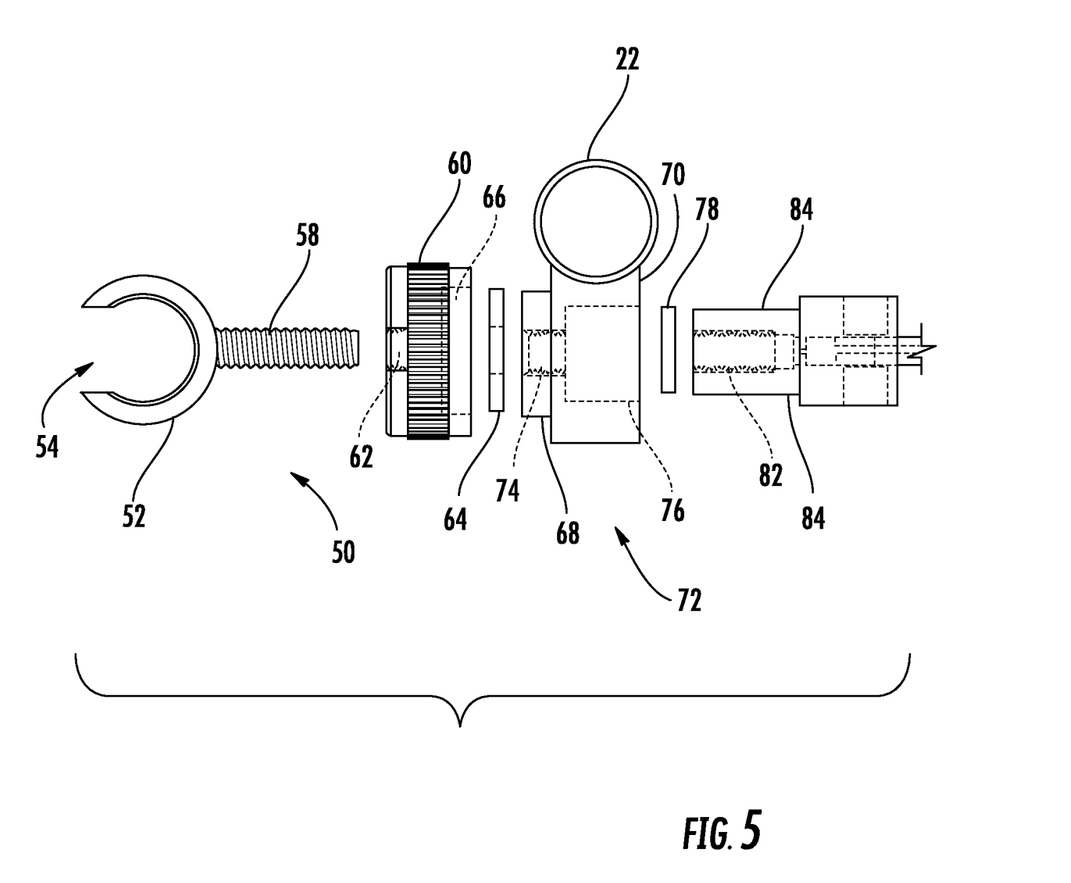
FIG. 5 is an exploded top plan view of the sprayer holder and mirror frame insertion member supported in relation to the bend pipe via a shower/mirror holder.

As shown in FIG. 4, the sprayer head 14 may be connected to a sprayer hose 24, which, in turn, is connected to a second outlet of the ball valve 16. In the illustrated embodiment, the sprayer head 14 has a female thread (not shown), and an upper end of the sprayer hose 24 has a male threaded fitting or end (not shown) that mates with the female thread. A lower end of the sprayer hose 24 has a female threaded fitting (not shown) that mates with a male thread (e.g., ½" BSP) on the ball valve 16. Of course, these connections form sealed connections, such as through the use of O-rings and/or washers (not shown), between the sprayer head 14 and the sprayer hose 24 and between the sprayer hose 24 and the ball valve 16, which allow fluid to flow from the ball valve 16 into the sprayer head 14.

The sprayer head 14 may be in any suitable form. The illustrated sprayer head 14 comprises a straight pipe defining a valve body 40, within which is a valve (not shown) controlled by a push button 42, which, when depressed or actuated to an open position, allows fluid to pass through the valve. The push button 42 is spring biased, or is depressed against a spring force, which moves the push button 42 back to a closed position, wherein the valve closes to prohibit fluid from flowing therethrough. An exemplary sprayer head may comprise a model HF GUN PRESTIGE by KINDLE™. Extending from the valve body 40 is an angle tube 44 with an offset or angularly disposed portion at a proximal or terminal end thereof. The terminal end of the angle tube 44 is threaded with a male thread (not shown), which is engageable with a female thread (not shown) within a distal end of a cap 46. A proximal end of the cap 46 is threaded with a female thread, which mates with a male thread on a diffuser 48. The diffuser 48 may cause fluid to be directed therefrom in a spray pattern. It should be appreciated that an aerator, screen, filter and/or the like may be supported by the proximal end of the cap 46.

The sprayer head 14 may be supported in relation to the bend pipe 22, so that the sprayer head 14 is readily available for use, but out of the way when not in use. Although this can be done in any suitable manner, in the illustrated embodiment, the sprayer head 14 is supported in relation to the bend pipe 22 via a sprayer holder, as generally indicated at 50 in FIG. 1.

Figure 6:
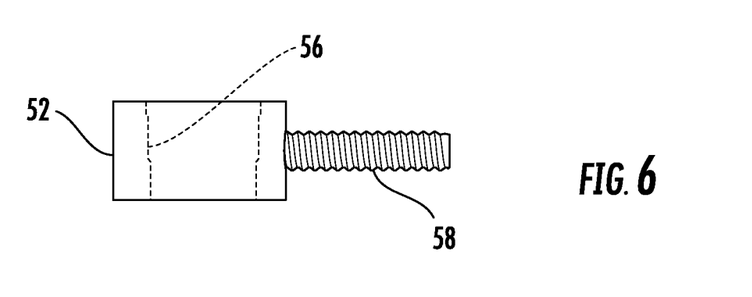
FIG. 6 is an enlarged side elevational view of a C-shaped member of a sprayer holder for supporting the sprayer head.
Figure 7:
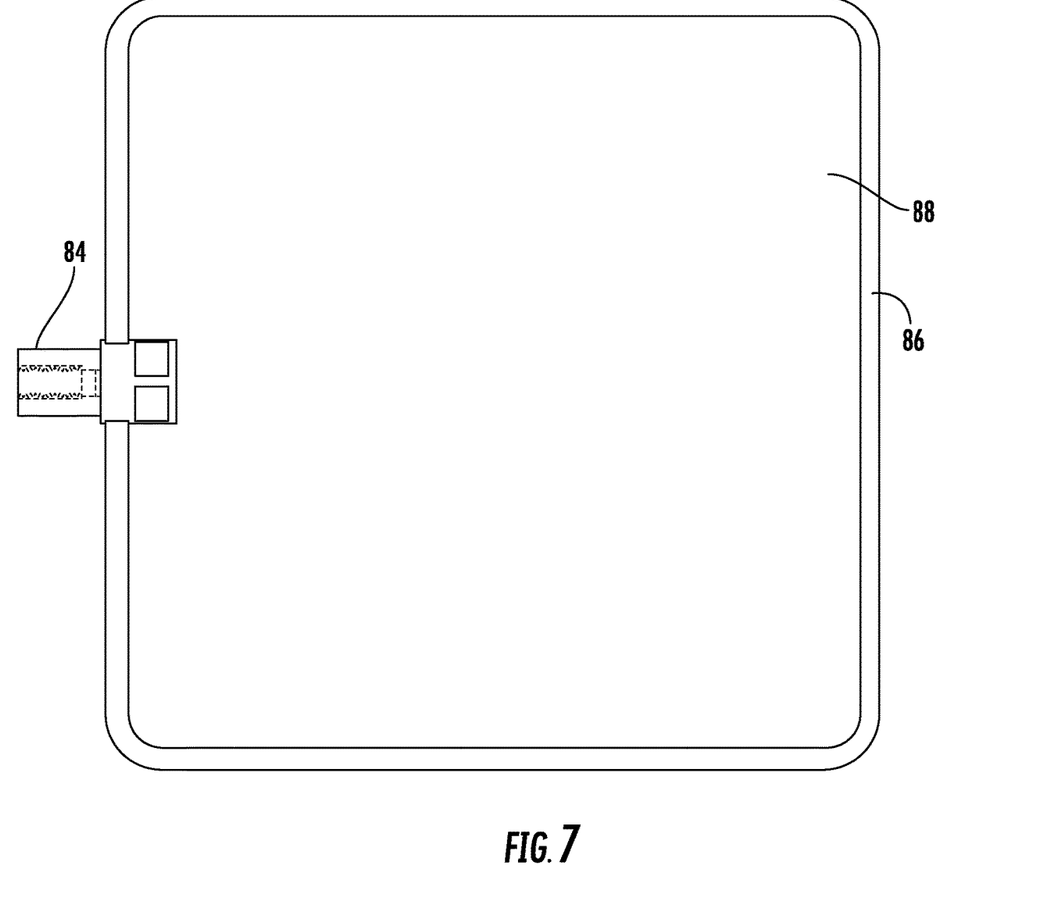
FIG. 7 is an enlarged front plan view of a mirror sized and configured to be supported in relation to the shower/mirror holder.

As shown in FIG. 6, the illustrated sprayer holder 50 may be comprised of a C-shaped member 52, defining an opening 54 through which the sprayer hose 24 may pass. The C-shaped member 52 has a tapered inner wall 56 (shown in FIG. 7), wherein the taper narrows downwardly so that a lower end of the C-shaped member 52 more snuggly supports the sprayer head 14 when inserted therein.

The C-shaped member 52 may be supported in relation to the bend pipe 22 in any suitable manner. In the illustrated embodiment, a threaded shaft 58 (e.g., M6 threads) extends transversely (i.e., extending horizontally when viewing FIG. 6) in relation to the C-shaped member 52. A sprayer holder nut 60 has a radially centered female thread 62 (e.g., M6 threads) extending therethrough (i.e., extending horizontally when viewing the drawings) that mates with the threaded shaft 58. A washer 64, which may be a silicone washer, may be nested within an inner area 66 defined at least partially by an inner wall (shown but not referenced) within the sprayer holder nut 60. The inner area 66 is sized and configured to cooperate with a reduced diameter portion 68 that extends transversely from one side of a central portion 70 of a mirror/sprayer holder 72. The washer 64 is located between the sprayer holder nut 60 and the reduced diameter portion 68. The mirror/sprayer holder 72 is provided with a radially centered female thread 74 (e.g., M6 threads), which extends axially through the reduced diameter portion 68 (i.e., extending horizontally when viewing the drawings) to an inner area 76 defined at least by an inner wall (shown but not referenced) within the central portion 70 of the mirror/sprayer holder 72, opposite the reduced diameter portion 68. The threaded shaft 58 extending from the C-shaped member 52 threads through the female thread 62 of the sprayer holder nut 60, passes through the washer 64, and threads through the female thread 74 extending through the reduced diameter portion 68. The sprayer holder nut 60 functions as a lock nut, when tightened against the reduced diameter portion 68, to prevent threaded movement of the threaded shaft 58 in relation to the female thread 74 extending through the reduced diameter portion 68. This prevents rotational movement of the C-shaped member 52 in relation to the mirror/sprayer holder 72. The washer 64 functions as a resilient member between the sprayer holder nut 60 and the mirror/sprayer holder 72.

Figure 8:
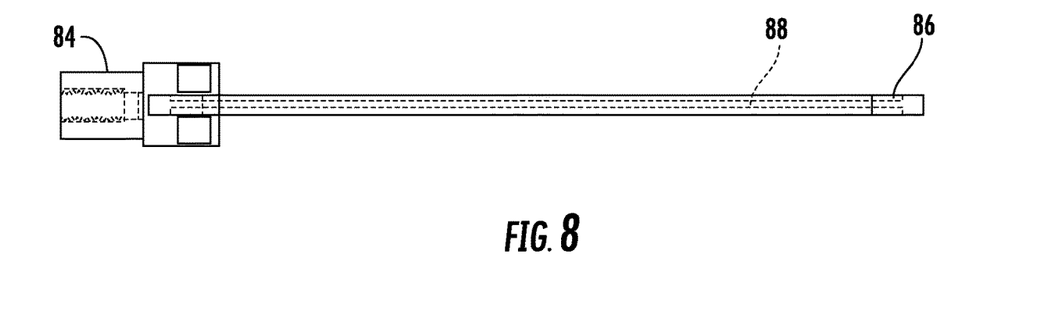
FIG. 8 is an enlarged top plan view of the mirror shown in FIG. 8.
Figure 9:
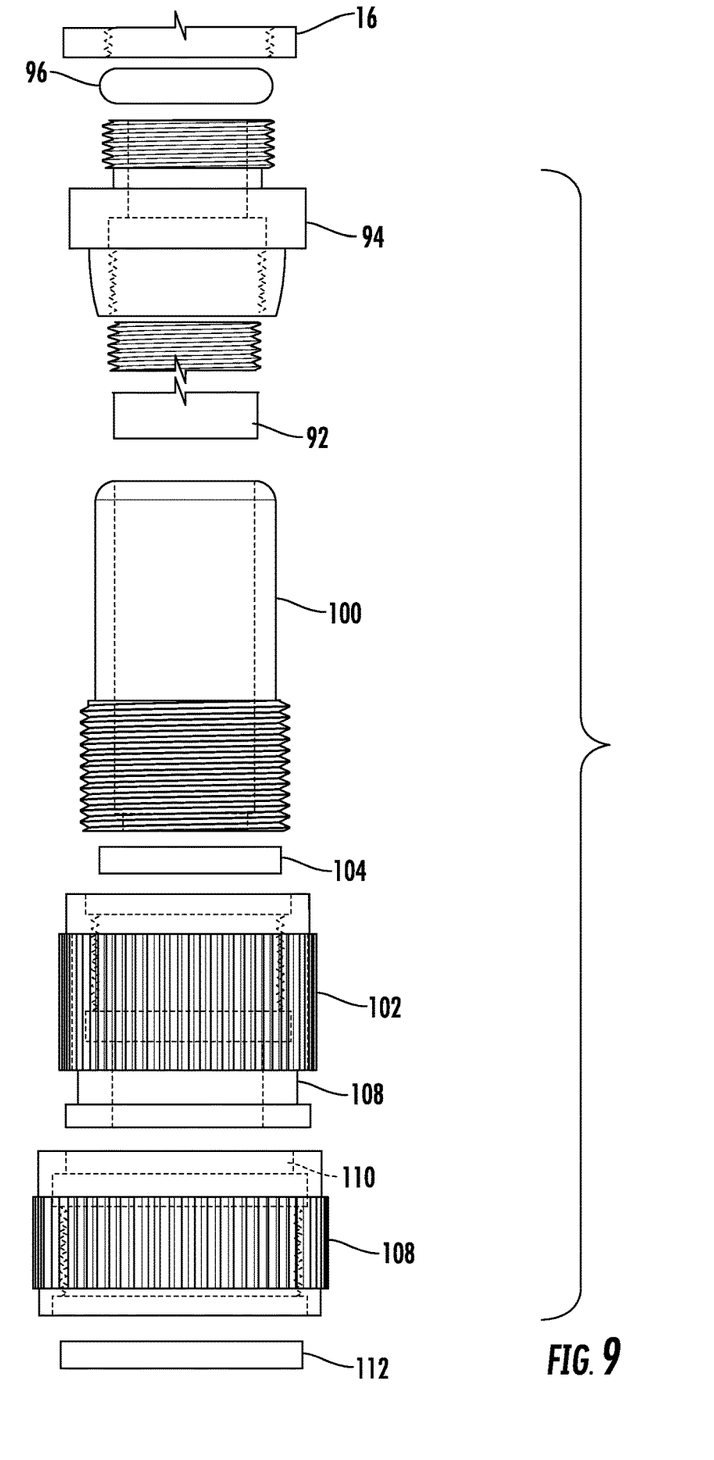
FIG. 9 is an enlarged side elevational view of a clipping attachment for connecting a lower end of the straight pipe to a hose attachment.

A washer 78, which may be a silicone washer, may be nested within the inner area 76 within the central portion 70 of the mirror/sprayer holder 72. The threaded shaft 58 passes through the washer 68, and mates with female threads 82 (e.g., M6 threads) of an insertion member 84. The insertion member 84 is sized and configured to be inserted into the inner area 76 of the central portion 70 of the mirror/sprayer holder 72. The washer 78 functions as a resilient member between the insertion member 84 and the mirror/sprayer holder 72. The insertion member 84 supports a mirror frame 86, which, in turn, supports a mirror 88, as shown in FIGS. 8 and 9.

It should be appreciated that the inner area 66 of the sprayer holder nut 60, the reduced diameter portion 68, the inner area 76 of the central portion 70 of the mirror/sprayer holder 72 and an outer surface of the insertion member 84 may all be substantially cylindrical to rotationally cooperate with one another. Also, the female threads 62, 74, 82 axially align with one another when the mirror/sprayer holder 72 is assembled to allow the threaded shaft 58 to be threaded therethrough.

The mirror/sprayer holder 72 is supported in fixed relation to the bend pipe 22. This may be done in any suitable manner. For example, the illustrated mirror/sprayer holder 72 may have an outwardly presented curved relief, or concave portion (shown in FIG. 7 but not referenced), which mates with an outer surface of the bend pipe 22. The mirror/sprayer holder 72 may be mounted or attached to the bend pipe 22, via the concave portion in any suitable manner, including but not limited to soldering, brazing or welding, or in another suitable manner.

It should be appreciated that the sprayer holder 50 and the mirror 88 are dimensioned and configured to cooperate with the mirror/sprayer holder 72 in a manner so as to support the sprayer holder 50 and the mirror 88 for pivotal movement in relation to the mirror/sprayer holder 72.

Figure 10:
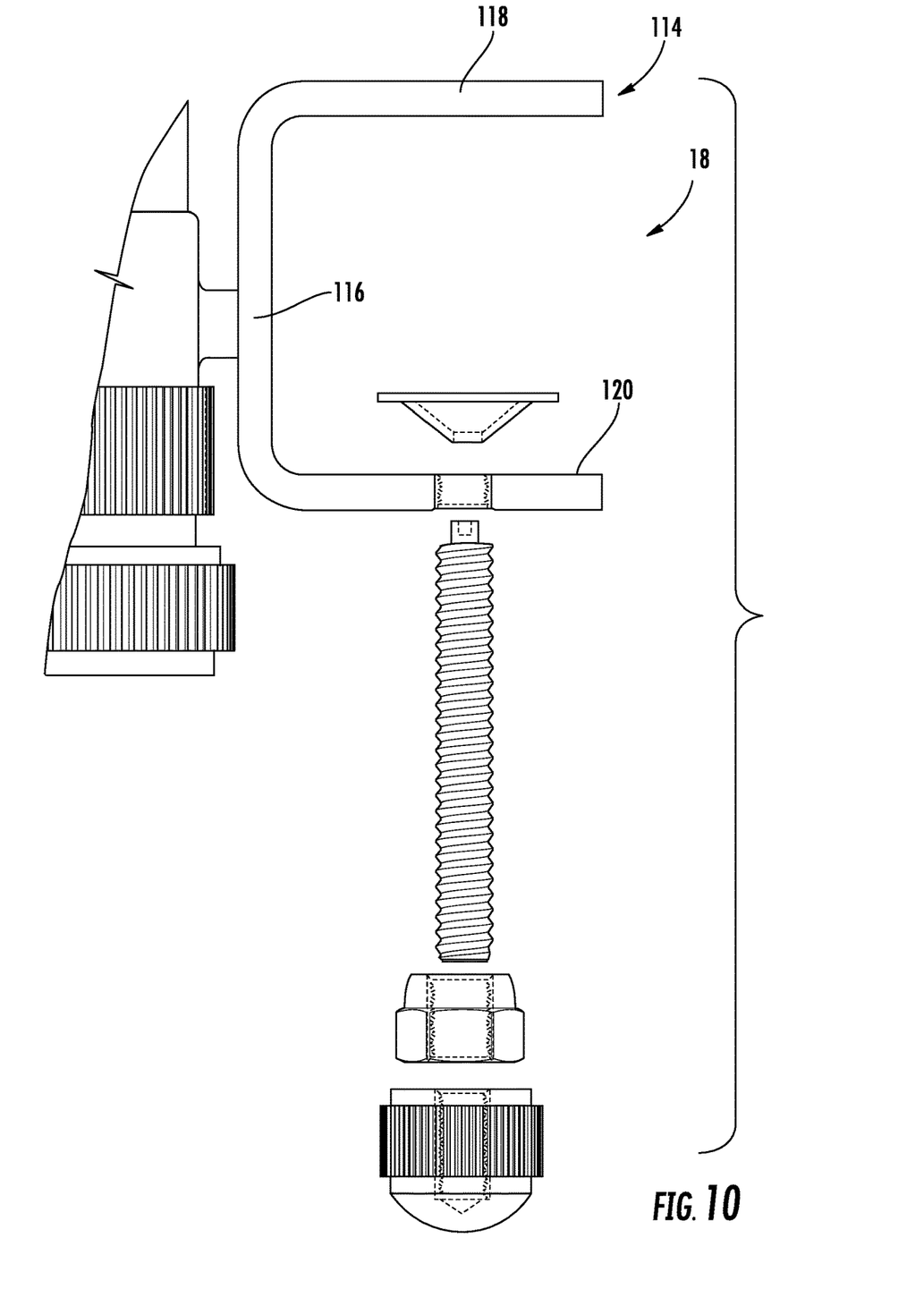
FIG. 10 is an enlarged side elevational view of a C-clamp assembly for supporting the faucet in relation to an environmental surface.

The ball valve 16 is preferably a three-way ball valve, which is diagrammatically represented in FIGS. 10A-C. The ball valve 16 may comprise any suitable ball valve, which may be controlled in any suitable manner. In the illustrated embodiment, the ball valve 16 is controlled by a rotating handle 90 (shown in FIG. 4), which controls the movement of a valve ball within the valve body. In a first or off position (shown in FIG. 10A), the ball valve 16 is "off". In this position, the ball valve 16 prohibits fluid flow therethrough. In a second position (shown in FIG. 10B), the valve diverts fluid flow to the bend pipe 22, which, in turn, directs fluid to the shower nob 12. In a third position (shown in FIG. 10C), the valve diverts fluid flow to the sprayer hose 24, which, in turn, directs fluid to the sprayer head 14. It should be appreciated that the ball valve 16 may be controlled so that fluid may flow between the second and third positions, to divert fluid to both the bend pipe 22 and the sprayer hose 24, to direct fluid flow to both the shower nob 12 and the sprayer head 14 at the same time.

An inlet of the ball valve 16 is connected to a straight pipe 92, as shown in FIG. 11. This can be done in any suitable manner. In the illustrated embodiment, the inlet is provided with a male thread (e.g., ¾" BSP (LH)). A pipe to valve connector 94 has an upper end that is threaded with a female thread (e.g., ¾" BSP (LH)) to mate with the male threads of the inlet of the ball valve 16. A seal, such as an O-ring 96, is provided between the pipe to valve connector 94 and the ball valve 16. This arrangement provides a sealed connection between the ball valve 16 and the pipe to valve connector 94. A lower end of the pipe to valve connector 94 is provided with a female thread (e.g. M16 thread) that mates with a male thread (e.g. M16×1" pitch thread) at an upper end of the straight pipe 92.

A lower end of the straight pipe 92 supports a hose attachment 98 (e.g., for a garden hose). This can be done in any suitable manner. In the illustrated embodiment, a clipping attachment 100 is supported in relation to the lower end of the straight pipe 92, such as, for example, by soldering, brazing or welding. An upper clipping knob 102 is supported in relation to the clipping attachment 100. In the illustrated embodiment, a lower end portion of the clipping attachment 100 is threaded with a male thread (e.g., ½" BSP), while an upper end of the upper clipping knob 102 is threaded with a female thread (e.g., ½" BSP). An inner wall of the upper clipping knob 102 has a reduced diameter portion, which defines a shoulder upon which seats a seal, such as a silicone washer 104, so as to provide a seal between the clipping attachment 100 and the upper clipping knob 102. The upper clipping knob 102 is threaded onto the clipping attachment 100 until a lower end of the clipping attachment 100 sealingly engages the seal.

A lower clipping knob 106 is supported for rotational movement in relation to the upper clipping knob 102. This is done in any suitable manner. In the illustrated embodiment, a lower end of the upper clipping knob 102 has an annular recess 108 and an upper end of the lower clipping knob 102 has an annular lip 110. The upper end of the lower clipping knob 102 may be radially crimped in an inward direction so that the annular lip 110 engages the annular recess 108, in a manner that is sufficiently loose to permit the lower clipping knob 106 to move rotationally in relation to the upper clipping knob 102.

To connect to a hose, a lower end portion of the lower clipping knob 106 is provided with a male thread (e.g., ½" FPT thread), which preferably mates with the standard female thread of a garden hose. A seal, such as a silicone washer, is supported within the lower clipping knob 106. Upon threading the lower clipping knob 106 onto the hose (not shown), the hose engages the seal to form a fluid-tight seal between the lower clipping knob 106 and the hose, while allowing fluid to flow from the hose attachment 98 into the straight pipe 92.

The straight pipe 92 is supported in relation to the C-clamp assembly 18, shown in FIG. 12. The C-clamp assembly 18 comprises a C-shaped clamp bracket 114, which is supported in fixed relation to the straight pipe 92. This can be done in any suitable manner. In the illustrated embodiment, the C-shaped clamp bracket 114 has an intermediate portion 116 that is welded to the straight pipe 92. The C-shaped clamp bracket 114 has upper and lower legs 118, 120 extending transversely therefrom. The upper leg 118 has an underside that is arranged and configured to engage an upper surface of an environmental structure (not shown). The lower leg 120 has a threaded hole 122 passing therethrough. A threaded C-clamp attachment rod 124 is threaded into the threaded hole 122. An upper end of the threaded C-clamp attachment rod 124 supports for rotation a round gripper 126, which is configured to engage an underside of the environmental structure. The round gripper 126 may be supported in any suitable manner. For example, in the illustrated embodiment, the upper end of the threaded C-clamp attachment rod 124 has a reduced diameter portion that fits within a centrally located hole in the round gripper 126. The upper end of the threaded C-clamp attachment rod 124 is peened, flared or swaged to deform the upper end and thus, retain the round gripper 126. A chuck nut 128 is threaded onto a lower end of the threaded C-clamp attachment rod 124 (e.g., via M10×1.5" threads). A tightening knob 130 is threaded onto the lower end of the threaded C-clamp attachment rod 124, and into engagement with the chuck nut 128 to hold the tightening knob 130 in place (i.e., in a fixed position) in relation to the threaded C-clamp attachment rod 124. Turning the tightening knob 130, rotates the threaded C-clamp attachment rod 124 to cause the round gripper 126 to engage the underside of the environmental structure. Continued tightening causes the round gripper 126 to tightly engage the underside of the environmental structure to hold the faucet 10 in fixed relation to the environmental structure. Loosening the threaded C-clamp attachment rod 124 causes the round gripper 126 to disengage from the environmental surface, thus allowing the faucet 10 to be removed therefrom.

It should be appreciated that various components may include a toothed surface, a gnarled surface, or some other suitable surface for gripping, as is clearly shown in the drawings.

It should be noted that orientational terms, such as proximal, distal, downward, upper, lower, underside, are in reference to the faucet as shown in the drawings. The drawing figures depict the faucet in an orientation of normal use, which could obviously change. Therefore, orientational terms should be understood to be provided for semantic purposes, and are not intended to limit the faucet or component parts thereof in any particular way.

Although the faucet has been described in terms of certain components being referred to in either the singular or the plural, other arrangements are possible. For example, it is to be understood that due to the conceptual description presented herein, components presented in the singular may be provided in the plural.

It should be appreciated that the faucet and the component parts thereof may be formed of any suitable material, including, for example, metal (e.g., SS 304 stainless steel), plastic, hard rubber, or other suitable material. Various components thereof may be of solid construction or hollow, or a combination thereof. The same may be cast, cut, molded, extruded or formed in some other suitable manner.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A portable faucet configured for attachment with a source of water via a hose, the faucet comprising:
   a shower nob, and
   a sprayer head,
   a main valve, the shower nob connected in relation to the main valve, the sprayer head connectable in relation to the main valve, the main valve being operable to selectively direct fluid to the shower nob and the sprayer head,
   a hose attachment connected in relation to the main valve, the hose attachment for attachment of the hose originating from the water source for directing water from the water source to the valve, and
   a clamp assembly for releasably supporting the main valve in relation to an environmental surface, the clamp assembly comprising opposing parts, at least one of the opposing parts being adjustable to bring the opposing parts closer together to hold the environmental surface therebetween.

2. The faucet of claim 1, wherein the main valve is a three-way valve having an inlet, a first outlet and a second outlet, the hose attachment being connected in relation to the inlet, the shower nob being connected in relation to the first outlet, and the sprayer head being connected in relation to the second outlet.

3. The faucet of claim 2, wherein the three-way valve is selectively operable to a first position, wherein fluid flow is prohibited through the valve, a second position, wherein fluid flow is directed to the shower nob, and a third position, wherein fluid flow is directed to the sprayer head.

4. The faucet of claim 3, wherein the three-way valve is further configured to direct fluid flow to the second and third positions, to direct fluid flow to both the shower nob and the sprayer head.

5. The faucet of claim 2, further comprising a bend pipe in the form of a gooseneck, the bend pipe having a first end and a second end, the first end connected in relation to the first outlet and the second end connected to the shower nob.

6. The faucet of claim 5, further comprising a rotating tap system, the rotating tap system connecting the first end of the bend pipe to the first outlet, the rotating tap system supporting the bend pipe for rotational movement in relation to the main valve while maintaining a water tight seal during use.

7. The faucet of claim 5, further comprising a sprayer hose, the sprayer hose having a first end and a second end, the first end being connectable in relation to the second outlet and the second end being connected to the sprayer head.

8. The faucet of claim 7, wherein the sprayer hose is configured to disconnect from the second outlet and to connect to the shower nob.

9. The faucet of claim 7, wherein the sprayer head comprises a secondary valve operable to control fluid passing through the sprayer head independent of the main valve, and wherein the secondary valve is configured to cause fluid to be directed from the secondary valve in a spray pattern.

10. The faucet of claim 7, further comprising a sprayer holder supported by the bend pipe for removably supporting the sprayer head in relation to the bend pipe so that the sprayer head is readily available for use by a user but out of the way when not in use.

11. The faucet of claim 10, further comprising a mirror supported in relation to the bend pipe.

12. The faucet of claim 11, further comprising a mirror holder, the mirror supported in relation to the bend pipe by the mirror holder.

13. The faucet of claim 12, further comprising a mirror/sprayer holder supported in fixed relation to the bend pipe, the sprayer holder and the mirror holder supported for rotational movement in relation to the mirror/sprayer holder, the sprayer holder and the mirror holder being rotationally adjustable in relation to the mirror/sprayer holder.

14. The faucet of claim 13, wherein the sprayer holder comprises a C-shaped member for receiving the sprayer head.

15. The faucet of claim 14, wherein the C-shaped member defines an opening through which the sprayer hose may pass, the C-shaped member having a tapered inner wall that more snuggly contacts the sprayer head as the sprayer head is lowered into the C-shaped member.

16. The faucet of claim 5, further comprising a towel holder, the towel holder extending from the bend pipe, the towel holder being configured to support a towel in relation to the bend pipe.

17. The faucet of claim 16, wherein the towel holder extends from a back portion of the bend pipe in a direction away from a user.

18. The faucet of claim 17, wherein the towel holder comprises a substantially L-shapes structure having a lower leg extending transversely from the bend pipe and an upper leg extends upwardly to provide a hook-shaped configuration.

19. The faucet of claim 5, further comprising a straight pipe having an upper end connected in relation to the inlet of the main valve and a lower end that supports the hose attachment, the hose attachment being supported for rotation in relation to the straight pipe.

20. The faucet of claim 19, wherein the straight pipe is supported in relation to the clamp assembly.

21. The faucet of claim 20, wherein the clamp assembly comprises a C-clamp assembly, comprising a C-shaped clamp bracket, which is supported in fixed relation to the straight pipe, the C-shaped clamp bracket having upper and lower legs, the upper leg having an underside that is arranged and configured to engage an upper surface of an environmental structure, the lower leg having a threaded hole passing therethrough, the clamp assembly further comprising a threaded C-clamp attachment rod that is threaded into the threaded hole, an upper end of the threaded C-clamp attachment rod supporting for rotation a round gripper, which is configured to engage an underside of the environmental structure upon threaded the threading C-clamp attachment rod into the threaded hole.

* * * * *